United States Patent [19]

Cahlander et al.

[11] Patent Number: 4,979,864
[45] Date of Patent: Dec. 25, 1990

[54] BASKET EMPTYING APPARATUS, LOCATING DEVICE AND METHOD

[75] Inventors: Robert L. Cahlander, Red Wing; David W. Carroll, Cannon Falls, both of Minn.; John O. Reinertsen, Glen Ellyn, Ill.

[73] Assignee: Restaurant Technology, Inc., Oak Brook, Ill.

[21] Appl. No.: 176,490

[22] Filed: Apr. 1, 1988

[51] Int. Cl.⁵ ............................................. B65G 65/38
[52] U.S. Cl. ................................... 414/421; 414/786; 414/420; 99/407
[58] Field of Search ............... 414/766, 767, 786, 403, 414/404, 421, 422, 419, 420, 408, 409, 425; 99/352, 371, 644, 373, 407, 409, 423

[56] References Cited

U.S. PATENT DOCUMENTS

| | | | |
|---|---|---|---|
| 2,616,359 | 11/1952 | Pierson | 99/407 |
| 3,101,043 | 8/1963 | Bushway | 99/407 |
| 3,218,960 | 11/1965 | Leiby et al. | 99/354 |
| 3,228,320 | 1/1966 | Tumonis | 99/409 |
| 3,279,635 | 10/1966 | Avery et al. | 414/420 |
| 3,283,695 | 11/1966 | Belshaw et al. | 99/354 |
| 3,340,792 | 9/1967 | Matzke | 99/405 |
| 3,354,813 | 11/1967 | Meyer et al. | 99/407 X |
| 3,410,198 | 11/1968 | Lohr et al. | 99/423 |
| 3,747,785 | 7/1973 | Dahlin | 414/421 X |
| 3,750,810 | 8/1973 | Stanfill | 414/421 |
| 3,908,531 | 9/1975 | Morley | 99/407 X |
| 3,954,052 | 5/1976 | Vegh et al. | 99/407 |
| 4,036,383 | 7/1977 | Allen | 414/420 |
| 4,176,590 | 12/1979 | Kochan | 99/405 |
| 4,527,940 | 7/1985 | Biery | 414/420 X |
| 4,719,850 | 1/1988 | Sowell | 99/407 X |

*Primary Examiner*—Frank E. Werner
*Attorney, Agent, or Firm*—Jenner & Block

[57] ABSTRACT

A basket of cooked food products is mounted on a support structure. The support structure is rigidly mounted to a rotatable shaft. The shaft is rotated through a predetermined angle so that the basket is tilted. The contents of the basket is then dumped out of the basket. The basket may be held by a first and second clamps which hold the basket at opposite ends.

15 Claims, 5 Drawing Sheets

BASKET EMPTYING APPARATUS, LOCATING DEVICE AND METHOD

FIELD OF THE INVENTION

The present invention relates to a method and apparatus for emptying the contents from baskets. More particularly, this invention relates to a method and apparatus wherein a basket is located and coupled in a predetermined position to a support structure and thereafter the support structure and basket are rotated through a predetermined angle so that food products in the basket are dispensed out through the open top of the basket. This provides more efficient handling and emptying of baskets.

BACKGROUND OF THE INVENTION

In many restaurants, particularly quick-service restaurants, various types of food products are placed into frying baskets and then the frying baskets are placed in frying vats during a cooking cycle. These food products might include fish filets, chicken patties, chicken or fish strips, chicken "nuggets," french fries and other food products.

After the cooking cycle, the frying basket with the cooked food product is removed from the frying vat. The basket may then be emptied into a cabinet, bin or other storage facility before being served. For example, a fry basket containing a batch of chicken nuggets may be emptied into a drawer. The chicken nuggets are then removed from the drawer and served to customers. Baskets of cooked french fries, for example, may be dumped into a single bin, and then served to customers in serving portions.

For the cooked products in a basket to be emptied into a drawer, bin or other storage facility, restaurant personnel must currently manually rotate or tilt the entire basket so that the cooked products move out of the basket and into the storage facility.

This manual operation has several disadvantages. First, physically weaker store personnel may have trouble manually rotating the basket. This trouble may result in the contents of the basket being dropped or its contents spilled. Since the contents are normally hot, the chance of physical injury may also be present. Further, these store personnel may become fatigued through this physical over-exertion.

Second, the contents of the basket may be spilled outside of the storage area. The area into which the basket contents are to be emptied may be narrow, and a certain degree of "aim" may be required for the contents to be received into this area. Any food products which fall onto the floor, etc., must be discarded, thereby causing a loss of revenue.

Third, it may be necessary to move the food products manually after being emptied from the basket. The food products may settle unevenly after being emptied out of the basket because of operator error in unloading.

Fourth, manual operation requires time. If emptying of fry baskets were done mechanically, store personnel would be able to perform other tasks.

A need exists for a method and apparatus that mechanically flips a basket of cooked food products which would be suitable for use in a robotized system for cooking food products.

A need also exists for a method and apparatus for unloading baskets of food products which reduces physical exertion of restaurant personnel.

A need exists for a method and apparatus that reduces the possibility of food products in a basket to be spilled in areas other than the storage facility where the food products are to be held.

A need also exists for a method and apparatus for unloading baskets of food products which reduces restaurant personnel time in unloading.

SUMMARY OF THE INVENTION

In accordance with the present invention, a method and apparatus for unloading cooked food products is provided which is especially suitable for use in a robotized cooking system. The invention involves temporarily coupling the basket to a support structure and then rotating the support structure through a predetermined angle so that the contents in the basket are emptied while coupled to the support structure.

In accordance with one aspect of the invention, an apparatus with a rotatably mounted shaft is provided. The apparatus further includes means for rotating the shaft through a predetermined angle of rotation from a load position to a dump position. The shaft may be rotated, for example, by a dual-action cylinder. The apparatus also includes structure for temporarily coupling the basket to the shaft while the basket is in an upright position and the shaft is in a load position to allow the basket to rotate through the same angle when the shaft is rotated to the dump position to empty the contents of the basket. The angle of rotation may be at least 90°. Structure is also provided for locating and supporting the basket in the apparatus in a predetermined orientation when the shaft is in the load position.

The basket may be mounted, for example, so that the longitudinal axis of the basket is coupled substantially parallel to the shaft. The basket is coupled to the shaft by first and second clamps which are attached to a support spaced apart from the shaft. The first and second clamps hold opposite ends of the basket. A slide is mounted for movement with the shaft to a location adjacent to the top of the basket coupled to the shaft so that the contents emptied out of the basket traverse the slide upon rotation of the shaft to the dump position.

The first clamp has a support member capable of supporting one end of the basket and includes a first, selectively movable clamp which moves between a first, open position and a second, closed position in which the first clamp holds the basket against the support member. The first clamp may have a pneumatically activated arm that closes against the basket to hold the basket against the support member. The first clamp may alternatively be a notch in which one end of the basket is placed to support one end of the basket when the second clamp is also supporting the other end of the basket.

The second clamp, has a handle support for supporting the handle of the basket and a second clamp which moves between a first, open position and a second, closed position in which the second clamp forces the handle of the basket against the handle support. The second clamp includes locator pins that extend from the handle support and fit into apertures in the handle of the basket. The second clamp may also have a pneumatically activated arm that closes against the handle to hold the basket against the handle support.

In accordance with another aspect of the invention, an apparatus in which a basket is coupled to a rotatably mounted shaft through a series of supports is provided. The basket is temporarily coupled to the shaft by a first elongated support which is rigidly mounted to the shaft, a second elongated support rigidly mounted to the first elongated support and generally parallel to the shaft, with the first and second clamps mounted to the second elongated support for holding the basket.

In accordance with another embodiment of the invention, a method for emptying the contents of a basket with a handle is provided. The basket is located and supported in a predetermined orientation relative to a rotatably mounted shaft, the shaft being capable of rotation through a predetermined angle of rotation from a load position to a dump position. The basket is temporarily coupled to the shaft with structure including locator pins that extend from a handle support and fit in the handle of the basket while the basket is in an upright position and the shaft is in an upright position to allow the basket to rotate through the angle when the shaft is rotated to the dump position to dump the contents of the basket. The shaft is then rotated through the predetermined angle to the dump position.

In accordance with another embodiment of the invention, an apparatus for emptying the contents of a basket having a handle in one of two predetermined locations is provided. Coupling structure is provided for temporarily coupling the basket to the shaft in first and second basket coupling positions. The structure for coupling includes two first clamps and a second clamp which are attached to a support spaced apart from the shaft. The two first clamps and the second clamp are capable of holding opposite sides of the basket to the shaft. The second clamp is attached to the support intermediate the two first clamps to allow the basket to be coupled to the second clamp and to one of the first clamps in a first basket coupling position and to the second clamp and to the other first clamp in a second basket coupling position.

Other objects and advantages of the invention will become apparent upon the following detailed description with reference to the drawings. Throughout the drawings, like reference numerals refer to like parts.

DETAILED DESCRIPTION OF THE PREFERRED EMBODIMENT

While the invention is useful for emptying many types of baskets, the invention is especially useful in unloading baskets typically used in restaurants for frying foods. The baskets typically have a base and four sidewalls extending generally upwardly therefrom. The base and sidewalls typically have four edges. The food products cooked in these baskets might include fish filets, chicken patties, chicken or fish strips, chicken "nuggets," french fries and other food products. The baskets may be mounted in a frying vat during cooking and removed after the cooking cycle has been completed.

Referring to the Figures generally and in particular to FIGS. 1–3, there is illustrated various aspects of a basket unloading apparatus 10 (hereinafter "apparatus 10") in accordance with the invention. Apparatus 10 includes a substantially horizontally mounted shaft 12. Although the cross-section of shaft 12 is depicted as being cylindrical, the cross-section of shaft 12 may be of any shape (i.e., square, rectangular, etc.). Shaft 12 is mounted to a housing (not shown) for rotation through a predetermined angle in the direction illustrated by arrow D from a load position to a dump position. Shaft 12 is coupled at some place along its length to means for rotating shaft 12, discussed below.

Figure 5:
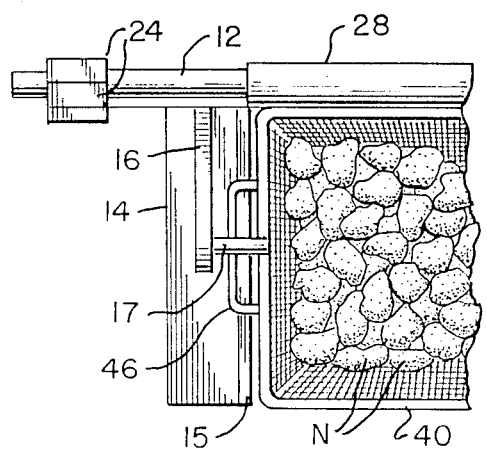
FIG. 5 is a top view of one embodiment of front clamp in its second position.

Mounting of basket 40 to apparatus 10 may be provided through various arrangements. As shown in the Figures, basket 40 is temporarily coupled to shaft 12, while basket 40 is in an upright position and shaft 12 is in the load position. Basket 40 then rotates through the same angle as shaft 12 when shaft 12 is rotated to its dump position to empty the contents of basket 40. Basket 40 is located and supported in apparatus in a predetermined orientation when the shaft is in its load position. FIGS. 1 and 3 show one such structure for orientation, namely a first clamp 14 and a second clamp 18. Placement of first clamp 14 with respect to second clamp 18, as illustrated, is not required; the placement of first clamp 14 with respect to second clamp 18 may be reversed. First clamp 14 and second clamp 18 are used to support opposite ends of basket 40. First clamp 14 includes a bracket support 15 and first clamp arm 16. A bracket 46 on basket 40 is mounted onto bracket support 15. First clamp arm 16 with pivot rod 16' in groove 21 pin 17 is capable of pivoting movement between an open position as illustrated in FIGS. 1 and 3, and a second, closed position as shown in FIG. 5. First clamp arm 16 may be pneumatically activated by cylinder 60 to its second position to close against bracket 46 to hold basket 40 against bracket support 15.

Figure 6:
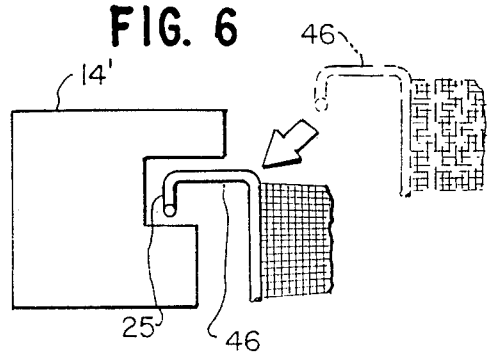
FIG. 6 is a side-sectional view of another embodiment of the front clamp.

An alternative embodiment for first clamp 14 is illustrated in FIG. 6. Specifically, first clamp 14 comprises a notch 25. As illustrated in dotted lines, bracket 46 is inserted into notch 25. Since basket 40 has a slight amount of flexibility, bracket 46 is slightly compressed as it is placed into notch 25 and the opposite end of basket 40 is being supported by second clamp 18. The torquing motion on bracket 46 as basket 40 is supported by first clamp 14 and second clamp 18 acts to wedge bracket 46 into notch 25.

Figure 1:
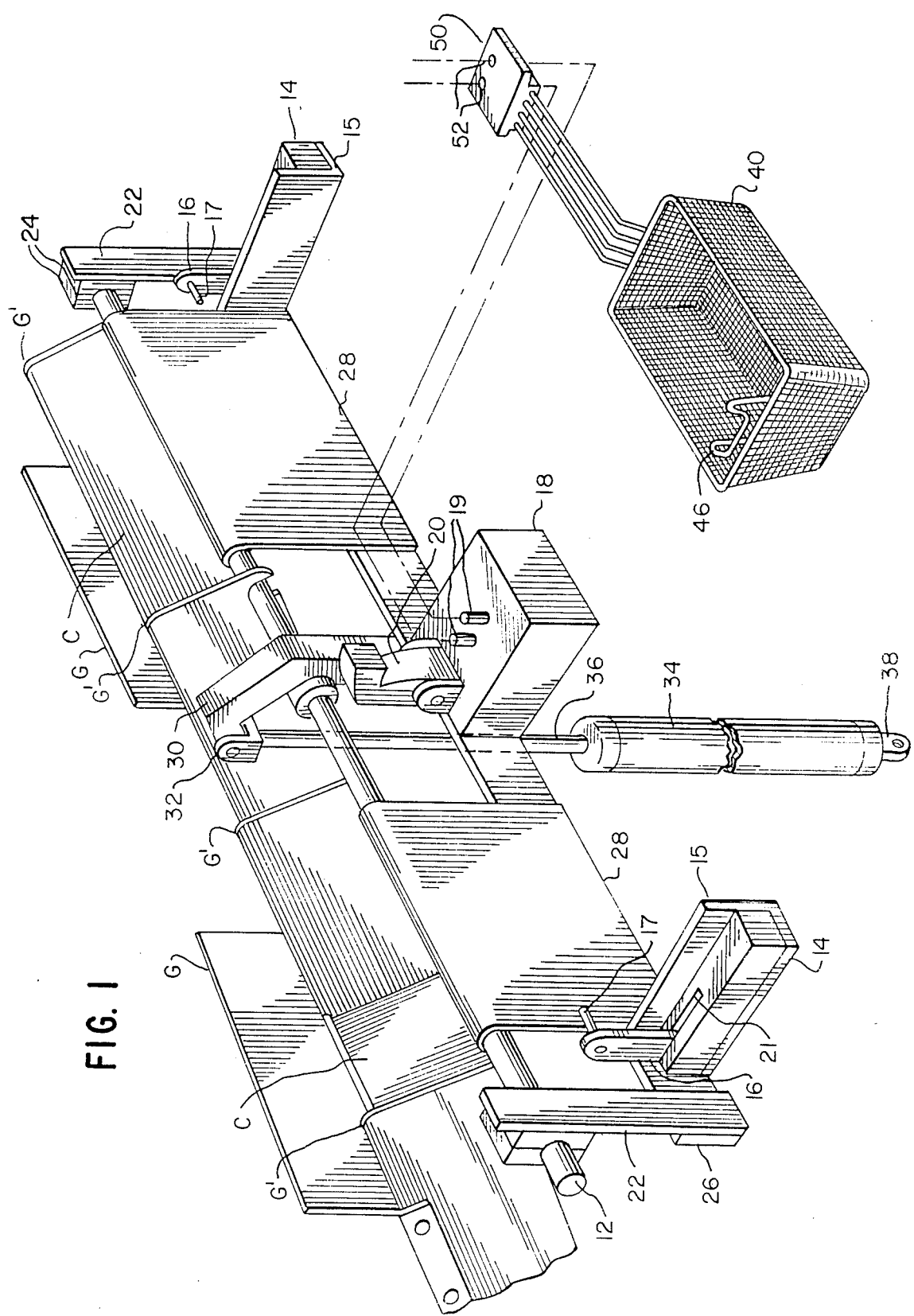
FIG. 1 is a perspective view of one embodiment of the invention.
Figure 3:
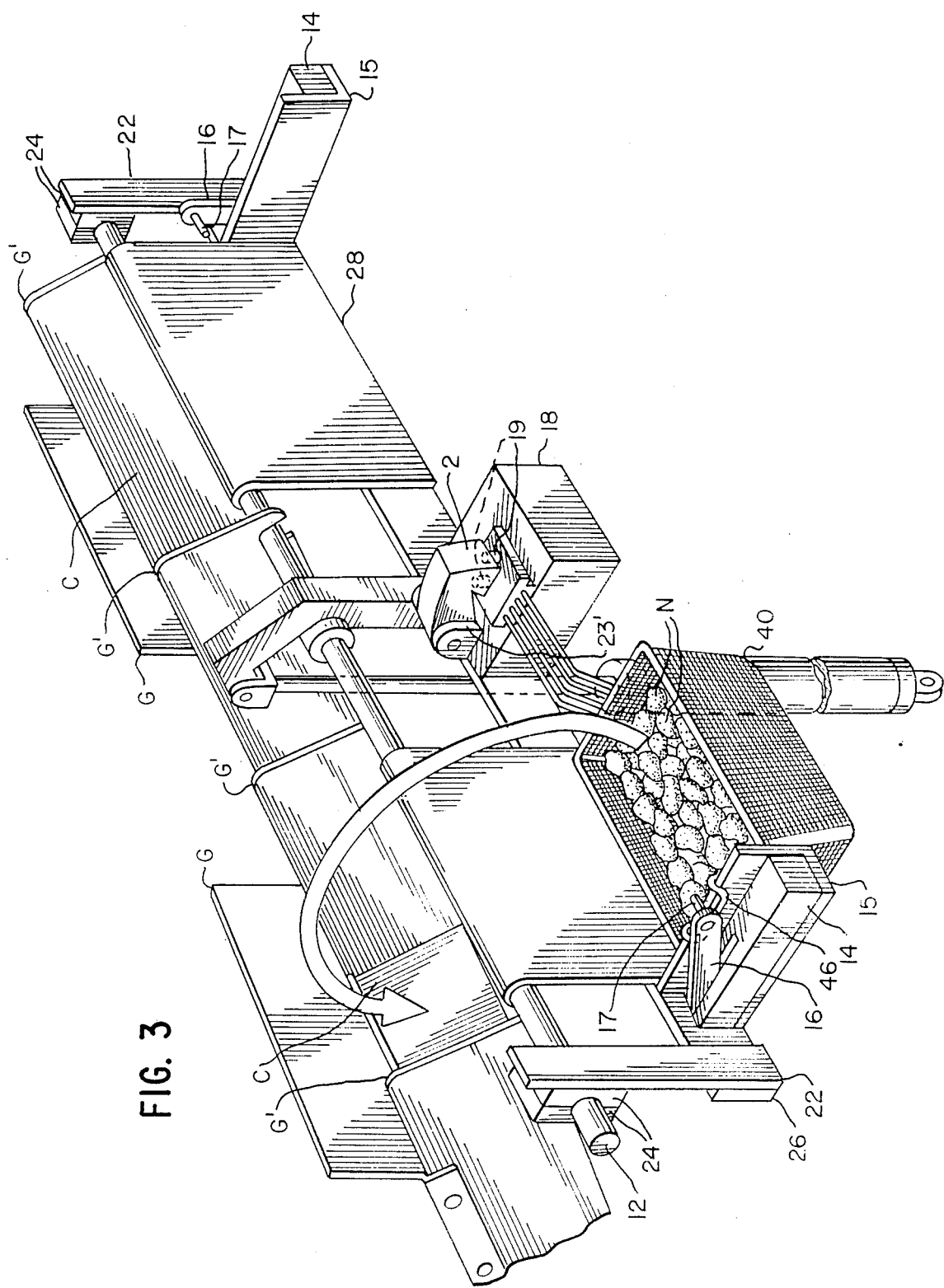
FIG. 3 is a perspective view of the invention illustrated in FIG. 2, with a loaded basket mounted in the invention.
Figure 7:
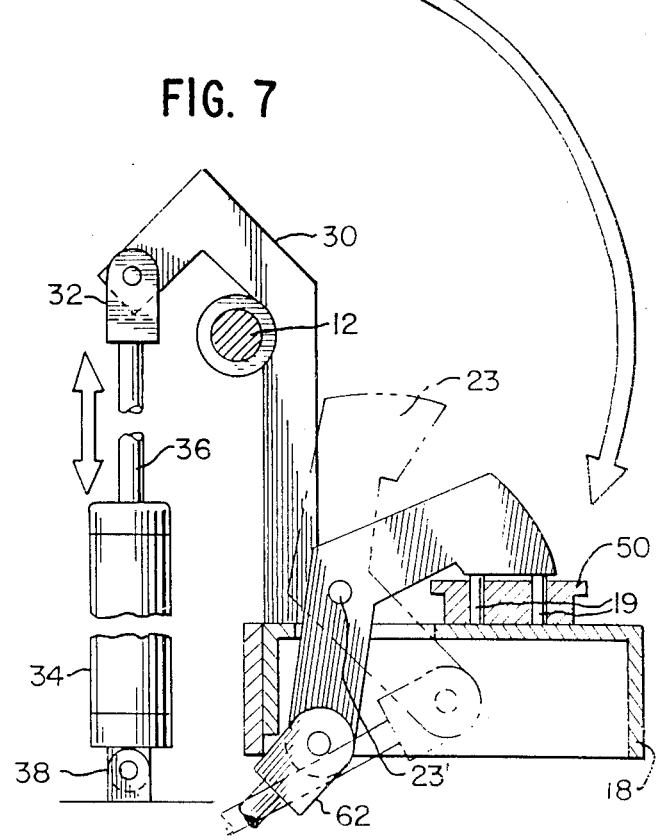
FIG. 7 is a side view of the second clamp in its second position.

Second clamp 18 is illustrated in FIGS. 1, 3 and 7. Second clamp 18 may be used to support the opposite end of basket 40 that has been supported by first clamp 14, preferably supporting the handle of basket 40. Second clamp 18 includes locator pins 19 which may be inserted through apertures 52 in the handle.

The use of locator pins 19 which may be inserted through apertures 52 in the handle is especially useful in a robotized cooking system. Locator pins 19 provide structure so that a robot will be able to place basket 40 into apparatus 10 at the same location every time, and the basket will be properly aligned so that the first and second clamp means will be able to properly couple basket 40 to apparatus 10. For an example and description of apparatus 10 and locator pins 19 being used in a robotized cooking system, reference is made to U.S. patent application Ser. No. 07/176,568, filed concurrently with this application (Attorney Docket No. 25570-44024), entitled "Food Preparation System and Method" by inventors R. L. Cahlander, D. W. Carroll, Robert A. Hanson, A. Hollingsworth, John O. Reinertsen, the disclosure of which is hereby incorporated by reference.

Second clamp 18 also includes a second clamp arm 20 which is pivotally mounted by bracket 23 and bracket pin 23'. Second clamp arm 20 is capable of pivotal movements between a first, open position as illustrated in FIG. 3 and a second, closed position as illustrated in FIG. 7. Second clamp arm 20 may be pneumatically activated by cylinder 62 connected to second clamp arm 20 by bracket 39 and bracket pin 39' in its second position to close against locator pins 19 and block 50. In its second position, a protrusion of second clamp mechanism 20 presses against block 50 of handle 48, thereby coupling basket 40. As illustrated in FIG. 7, locator pins 19 extend at a length slightly longer than thickness of block 50. Alternatively, the length of locator pins 19 may be approximately equal to or less than the thickness of block 50. This way, second clamp mechanism 20 may come to rest directly on block 50 to provide an additional means for securing basket 40.

First clamp 14 and second clamp 18 may be attached to shaft 12 by a series of supports. A first elongated support 22 may be attached to shaft 12 by brackets 24. A second elongated support 26 is rigidly mounted to first elongated support 22. Second support 26 may be so mounted generally parallel to shaft 12. First clamp 14 and second clamp 18 being attached to second elongated support 26.

Figure 4:
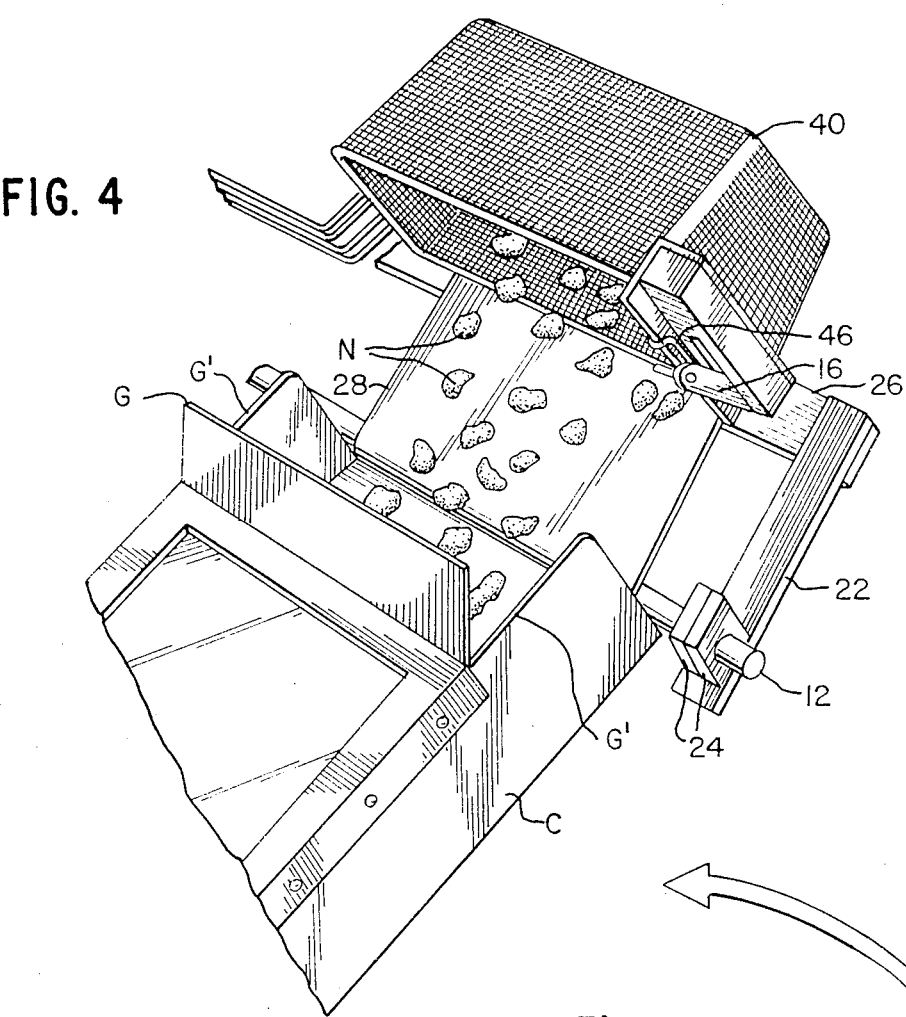
FIG. 4 is a perspective view illustrating the unloading of chicken nuggets from a rotated basket, the nuggets being received by a chute.

Apparatus 10 may further comprise a slide 28 which is mounted on and between shaft 12 and the top of basket 40, as shown in FIG. 4. Slide 28 assists in unloading basket 40 upon rotation in that food products N leaving basket 40 traverse slide 28.

The operation of apparatus upon rotation is illustrated in FIGS. 3-4. Basket 40 loaded with food products N has been mounted to first clamp 14 and second clamp 18 when shaft 12 is in its load position. Shaft 12 may then be rotated through a predetermined angle to its dump position. In FIG. 4, this angle of rotation is slightly more than 90 degrees from the mounting of basket 40 in FIG. 3. Upon rotation, food products N move by gravity out of basket 40 and into chute C. Top guides G' and side guides G' in FIG. 3 may be used to assist in directing nuggets N into chute C. Food products N traverse slide 28 after leaving basket 40 and before entering chute C.

Figure 8:
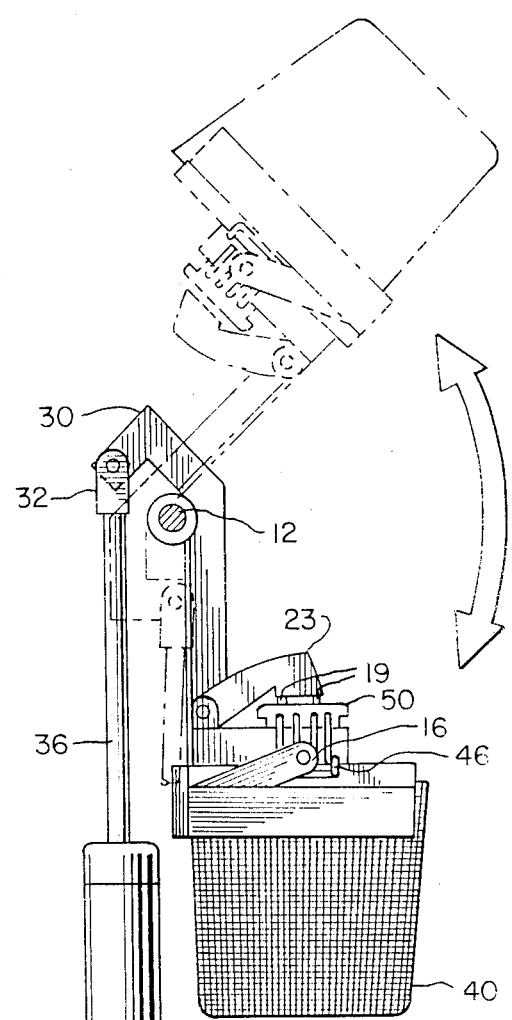
FIG. 8 is a side view of basket emptying apparatus illustrating the pneumatic cylinder and coupling used to rotate the shaft.
Figure 8:
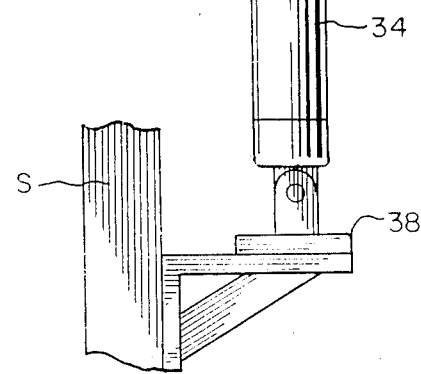

Shaft 12 may be rotatably driven by any one of a number of ways. For example, shaft 12 may be manually driven or by a dual-action cylinder 34 as illustrated in FIG. 8. Cylinder 34 may be pneumatic or hydraulic. One end of cylinder 34 is mounted to a support S through a cylinder mounting 38. Lever 30 is attached at one end to shaft 12 and at the other end to grip 32. Grip 32 is connected to plunger 36 of cylinder 34. Plunger 36 is capable of movement between an extended position in which shaft 12 is in the load position and a retracted position in which shaft 12 is in the dump position. In FIG. 8, plunger 36 is shown in between these positions. When cylinder 34 is activated, shaft 12 rotates through the predetermined angle.

Figure 2:
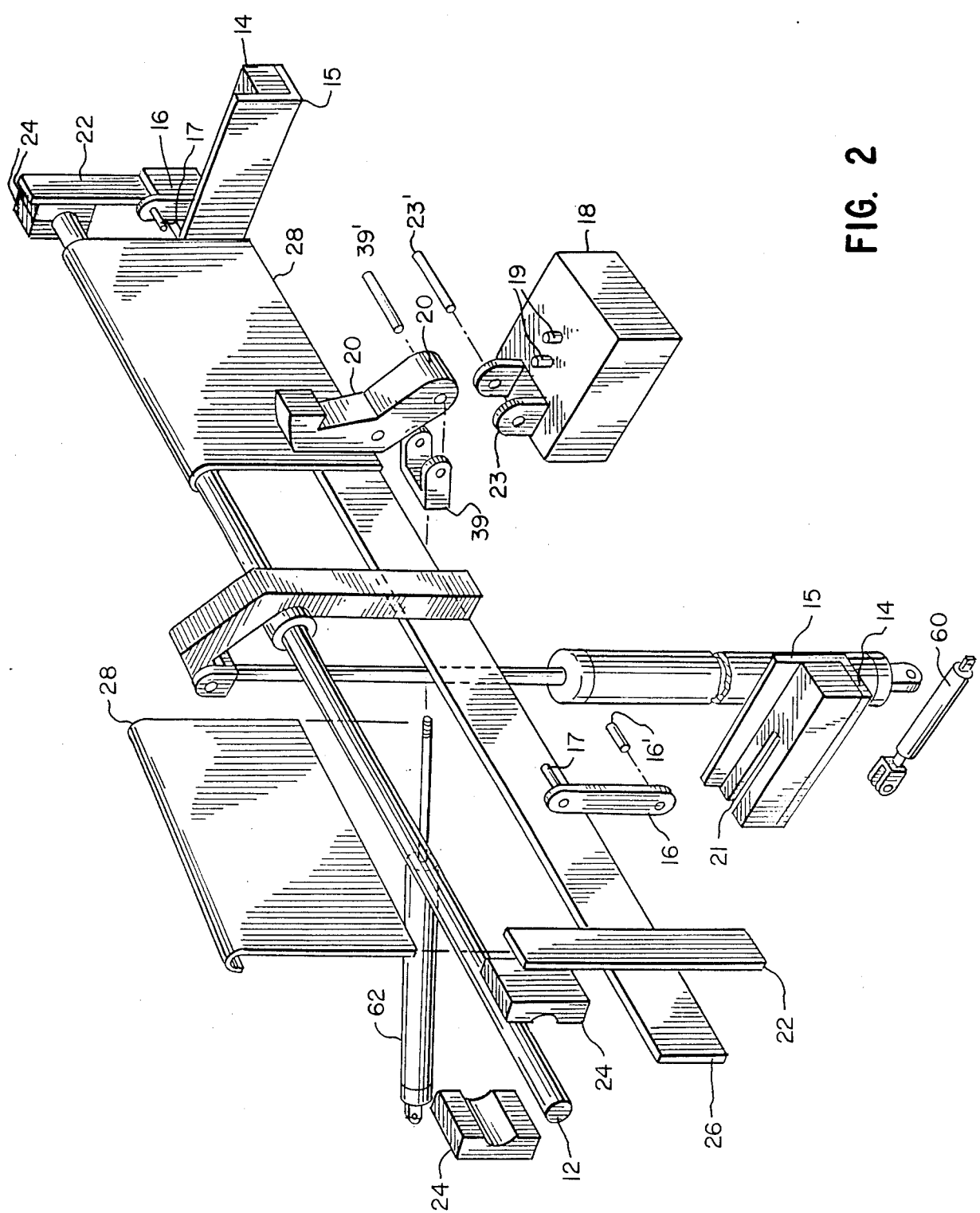
FIG. 2 is an exploded view of the invention illustrated in FIG. 1.

As illustrated in FIGS. 1-3, apparatus 10 may be equipped with two first clamps 14 and one second clamp 18 for emptying the contents of a basket with a handle in one of two predetermined locations. The two first clamps 14 may be located on opposite sides of second clamp 18, each at the same distance from second clamp 18. This way, one basket 40 may be mounted for unloading on one of the first clamps 14 and the second clamp 18 at one time and another basket 40 may be mounted for unloading on the other first clamp 14 and second clamp 18. This embodiment allows baskets 40 containing different food products to be unloaded in different locations by the same apparatus 10. Alternatively, more than one pair of first clamp 14 and second clamp 18 may be mounted on shaft 12.

Another embodiment of the invention is a method of unloading baskets of cooked food products. The basket is located and supported in a predetermined orientation relative to a rotatably mounted shaft, the shaft being capable of rotation through a predetermined angle of rotation from a load position to a dump position. The basket is temporarily coupled to the shaft while the basket is in an upright position to allow the basket to rotate through the same angle as the shaft when the shaft is rotated to the dump position to dump the contents of the basket and including locator pins that extend from a handle support and fit in the handle of the basket. The shaft is then rotated through the predetermined angle.

While the invention is described in connection with several preferred embodiments, it will be understood that it is not intended to limit the invention to these embodiments. On the contrary, it is intended to cover all alternatives, modifications and equivalents as may be included in the spirit and scope of this invention as defined by the appended claims.

What is claimed is:

1. An apparatus for emptying in one of two predetermined horizontally spaced apart locations the contents of a fry basket formed of a bottom, sidewalls, end walls and an open top and having an elongated handle at one end and a bracket at the other end, comprising:
   a rotatably mounted shaft;
   means for rotating said shaft through a predetermined angle of rotation from a load position to a dump position;
   coupling means for temporarily coupling the handle and the bracket of the basket in either of first and second horizontally spaced apart basket coupling positions to said shaft while the basket is in an upright position and said shaft is in a load position to allow the basket to rotate through said angle when said shaft is rotated to said dump position to dump the contents of the basket, said coupling means comprising an elongated support member which is rigidly mounted and parallel to said shaft, and first and second clamps mounted to said elongated support member for holding said basket, said first clamp having a bracket support for supporting the bracket of the basket and a first selectively moveable arm which pivots between a first, open position and a second, closed position in which said first selectively moveable arm holds said bracket against said bracket support, and said second clamp having a handle support for supporting the handle of the basket and a second selectively moveable arm which moves between a first, open position and a second, closed position in which said second selectively moveable arm holds said handle against said handle support; and means located on said handle support for locating the basket on said apparatus in either of said first and second horizontally spaced apart basket coupling positions when said shaft is in said load position.

2. The apparatus according to claim 1, further comprising a slide mounted for movement with said shaft and extending from said shaft to a location adjacent the top of the basket coupled to said shaft, the slide having a length at least approximately equal to the length of the basket excluding the lengths of the handle and the bracket, so that the contents emptied out of the basket upon rotation of the shaft to the dump position traverse said slide after leaving the basket.

3. The apparatus according to claim 1, wherein said locating means comprises locator pins that extend generally vertically upward from said handle support, and fit into apertures in the handle of the basket.

4. An apparatus for emptying the contents of a fry basket formed of a bottom, sidewalls, end walls and an open top and having an elongated handle at one end and a bracket at the other end, comprising:

a rotatably mounted shaft;

means for rotating said shaft through a predetermined angle of rotation from a load position to a dump position;

coupling means for temporarily coupling said basket to said shaft while the basket is in an upright position and said shaft is in said load position to allow said basket to rotate through an angle when said shaft is rotated to said dump position to dump the contents of said basket, said coupling means comprising an elongated support which is rigidly mounted and parallel to said shaft, and first and second clamps mounted to said elongated support for holding said basket, said first clamp having a support member with a notch formed therein in which the bracket of the basket is insertable to support said other end of the basket when said second clamp is also supporting the basket, and said second clamp having a handle support for supporting the handle of the basket and a selectively moveable arm which moves between a first, open position and a second, closed position in which said selectively moveable arm holds the handle of the basket against said handle support; and means located on said handle support for locating and supporting the basket on said apparatus in a predetermined orientation when said shaft is in said load position.

5. The apparatus according to claim 4, further comprising a slide mounted for movement with said shaft and extending from said shaft to a location adjacent the top of the basket coupled to said shaft, the slide having a length at least approximately equal to the length of the basket excluding the lengths of the handle and the bracket, so that the contents emptied out of said basket upon rotation of the shaft to the dump position traverse said slide after leaving said basket.

6. The apparatus according to claim 4, wherein said second clamp comprises locator pins that extend generally vertically upward from said support support and fit into apertures in the handle of the basket.

7. An apparatus for emptying in one of two predetermined horizontally spaced apart locations the contents of a fry basket formed of a bottom, sidewalls, end walls and an open top and having an elongated handle at one end and a bracket at the other end, comprising:

a rotatably mounted shaft;

means for rotating said shaft through a predetermined angle of rotation from a load position to a dump position;

coupling means for temporarily coupling the handle and the bracket of the basket in either of first and second horizontally spaced apart basket coupling positions to said shaft while the basket is in an upright position and said shaft is in a load position to allow the basket to rotate through said angle when said shaft is rotated to said dump position to dump the contents of said basket; and means associated with said coupling means for locating and supporting the basket on said apparatus in either of said first and second horizontally spaced apart basket coupling positions when said shaft is in said load position.

8. The apparatus according to claim 7, further comprising a slide at each predetermined horizontally spaced apart location mounted for movement with said shaft and extending from said shaft to a location adjacent the top of a basket coupled to said shaft, each slide having a length at least approximately equal to the length of the basket excluding the lengths of the handle and the bracket, so that the contents emptied out of the basket upon rotation of the shaft to said dump position traverse said adjacent slide after leaving the basket.

9. The apparatus according to claim 7, wherein said coupling means comprises two first clamp means spaced horizontally from each other and one on either side of a second clamp means which are attached to a support spaced apart from said shaft, said two first and second clamp means holding opposite side of the basket for coupling said basket to said shaft, said second clamp means being attached to said support intermediate said first clamp means to allow the basket to be coupled to said second clamp means and to one of said first clamp means in said first basket coupling position and to said second clamp means and to the other said first clamp means in said second basket coupling position.

10. The apparatus according to claim 9, wherein said first clamp comprises a pneumatically activated arm that closes against the basket to hold the basket against said support member.

11. The apparatus according to claim 7, wherein said first clamp means comprise a support member for supporting one end of the basket and a first, selectively movable clamp which moves between a first, open position and a second, closed position in which said first clamp holds the basket against said support member.

12. The apparatus according to claim 7, wherein said coupling means comprises two first clamps, spaced horizontally from each other and one on either side of a second clamp which are attached to a support spaced apart from said shaft wherein said first clamps comprise a notch in which the bracket of the basket is inserted to support the basket when said second clamp is also supporting the basket.

13. The apparatus according to claim 12 for emptying the contents of a basket having a handle, wherein said second clamp means comprises handle support for supporting the handle of the basket and a second, selectively movable clamp which moves between a first, open position and a second, closed position in which said second clamp holds the handle on the basket against the handle support.

14. The apparatus according to claim 13, wherein said second clamp means comprises locator pins that extend generally vertically upward from said handle support and fit into apertures in a handle of the basket.

15. The apparatus according to claim 13, wherein said second clamp comprises a pneumatically activated arm that closes against the handle of the basket against the handle support.

* * * * *